(12) United States Patent  (10) Patent No.: US 7,724,512 B2
Chen  (45) Date of Patent: May 25, 2010

(54) COMPUTER

(75) Inventor: Kuan-Ting Chen, Taipei (TW)

(73) Assignee: ASUSTeK Computer Inc., Taipei (TW)

( * ) Notice: Subject to any disclaimer, the term of this patent is extended or adjusted under 35 U.S.C. 154(b) by 0 days.

(21) Appl. No.: 12/329,625

(22) Filed: Dec. 7, 2008

(65) Prior Publication Data

US 2009/0147465 A1  Jun. 11, 2009

Related U.S. Application Data

(60) Provisional application No. 61/012,063, filed on Dec. 7, 2007.

(30) Foreign Application Priority Data

Sep. 16, 2008  (TW)  .............................. 97135486 A

(51) Int. Cl.
*G06F 1/20* (2006.01)
(52) U.S. Cl. ................................. 361/679.46
(58) Field of Classification Search ............ 361/679.46; 726/19
See application file for complete search history.

(56) References Cited

U.S. PATENT DOCUMENTS

| 6,008,986 | A | * | 12/1999 | Mok | ...................... 361/679.12 |
| 6,078,495 | A | * | 6/2000 | Cipolla et al. | .......... 361/679.46 |
| 6,097,595 | A | * | 8/2000 | Cipolla | .................. 361/679.21 |
| 6,175,492 | B1 | * | 1/2001 | Nobuchi | ................ 361/679.08 |
| 6,181,554 | B1 | * | 1/2001 | Cipolla et al. | .......... 361/679.46 |
| 6,437,978 | B1 | * | 8/2002 | Ozaki et al. | ............ 361/679.46 |
| 6,459,573 | B1 | * | 10/2002 | DiStefano et al. | ...... 361/679.46 |

FOREIGN PATENT DOCUMENTS

CN  1667637  9/2005

* cited by examiner

*Primary Examiner*—Lisa Lea-Edmonds
(74) *Attorney, Agent, or Firm*—Jianq Chyun IP Office

(57) ABSTRACT

A computer storing an operating system therein and including a first case, a second case, a driving mechanism and a starting unit is provided. The driving mechanism is connected between the first case and the second case. The starting unit is disposed at the first case, electrically connected to the driving mechanism, and used to start the operating system. When the starting unit starts the operating system, the driving mechanism drives a relative movement between the first case and the second case to enhance heat dissipation efficiency of the computer.

11 Claims, 2 Drawing Sheets

COMPUTER

CROSS-REFERENCE TO RELATED APPLICATION

This application claims the priority benefits of U.S. provisional application Ser. No. 61/012,063, filed on Dec. 7, 2007 and Taiwan patent application serial no. 97135486, filed on Sep. 16, 2008. The entirety of each of the above-mentioned patent applications is hereby incorporated by reference herein and made a part of specification.

BACKGROUND OF THE INVENTION

1. Field of the Invention

The present invention relates to a computer, especially a computer having better heat dissipation efficiency.

2. Description of Related Art

The current age is an age of information multimedia. Various personal computers (PCs), such as desktop PCs or notebook PCs, have gradually become indispensable tools in daily lives and jobs of people. Desktop PCs have advantages of easy expansion, convenient repairing and low price, so they become more popular than ever.

Backs of cases of bodies of desktop PCs usually comprise a plurality of heat dissipating holes, and heat generated when electronic devices in the cases perform calculations may be dissipated outside the cases through the heat dissipating holes. However, as calculation speeds of desktop computers gradually increase, the above said traditional heat dissipating method cannot satisfy heat dissipating efficiency requirement of desktop PCs.

SUMMARY OF THE INVENTION

The present invention provides a computer which provided with better heat dissipating efficiency.

The present invention provides a computer which stores an operating system and comprises a first case, a second case, a driving mechanism and a starting unit. The driving mechanism is connected between the first case and the second case. Additionally, the starting unit is disposed on the first case, electrically connected to the driving mechanism and used to start the operating system. When the starting unit starts the operating system, the driving mechanism drives a relative movement between the first case and the second case to enhance heat dissipating efficiency of the computer.

According to an embodiment of the present invention, the above said first case has an opening, and the second case covers the opening. The driving mechanism is used to drive a relative movement between the first case and the second case to have at least a part of the opening exposed. Preferably, the first case may further comprise a meshed element. The meshed element covers at least a part of the opening. Additionally, the driving mechanism is used to drive the relative movement between the first case and the second case to expose at least a part of the meshed element.

According to an embodiment of the present invention, the above said first case is hinged to the second case, and the driving mechanism is used to drive relative rotation between the first case and the second case to form a gap between the first case and the second case. The size of the gap is determined by range of the rotation.

According to an embodiment of the present invention, the above said starting unit comprises a key and a power switch. The key is disposed on the first case, while the power switch is disposed on the first case and electrically connected to the key. The key is used to be pressed by a user and start the operating system through the power switch.

According to an embodiment of the present invention, the above said starting unit comprises a biometric verification device and a power switch. The biometric verification device is disposed on the first case, while the power switch is disposed on the first case and electrically connected to the biometric verification device. The biometric verification device is used to identify a biometric datum and decides whether to start the operating system through the power switch according to the biometric datum. The above said biometric verification device may comprise one of a fingerprint identification device, a palm print identification device and a palm vein identification device.

According to an embodiment of the present invention, the above said driving mechanism comprises a motor and a transmission device. The motor is disposed at the first case, and the transmission device is connected between the second case and the motor. The motor is used to drive a relative movement between the first case and the second case via the transmission device. The above said transmission device may include at least one transmission belt, gear wheel, rack or chain.

According to an embodiment of the present invention, the above said driving mechanism comprises a motor and a transmission device. The motor is disposed at the second case, and the transmission device is connected between the first case and the motor. The motor is used to drive a relative movement between the first case and the second case via the transmission device. The above said transmission device may include at least one transmission belt, gear wheel, rack or chain.

In the computer of the present invention, when the starting unit starts the operating system, the driving mechanism connected between the first case and the second case drives a relative movement between the first case and the second case to enhance the heat dissipating efficiency of the computer.

In order to make the aforementioned and other objects, features and advantages of the present invention more comprehensible, several embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

Figure 1:
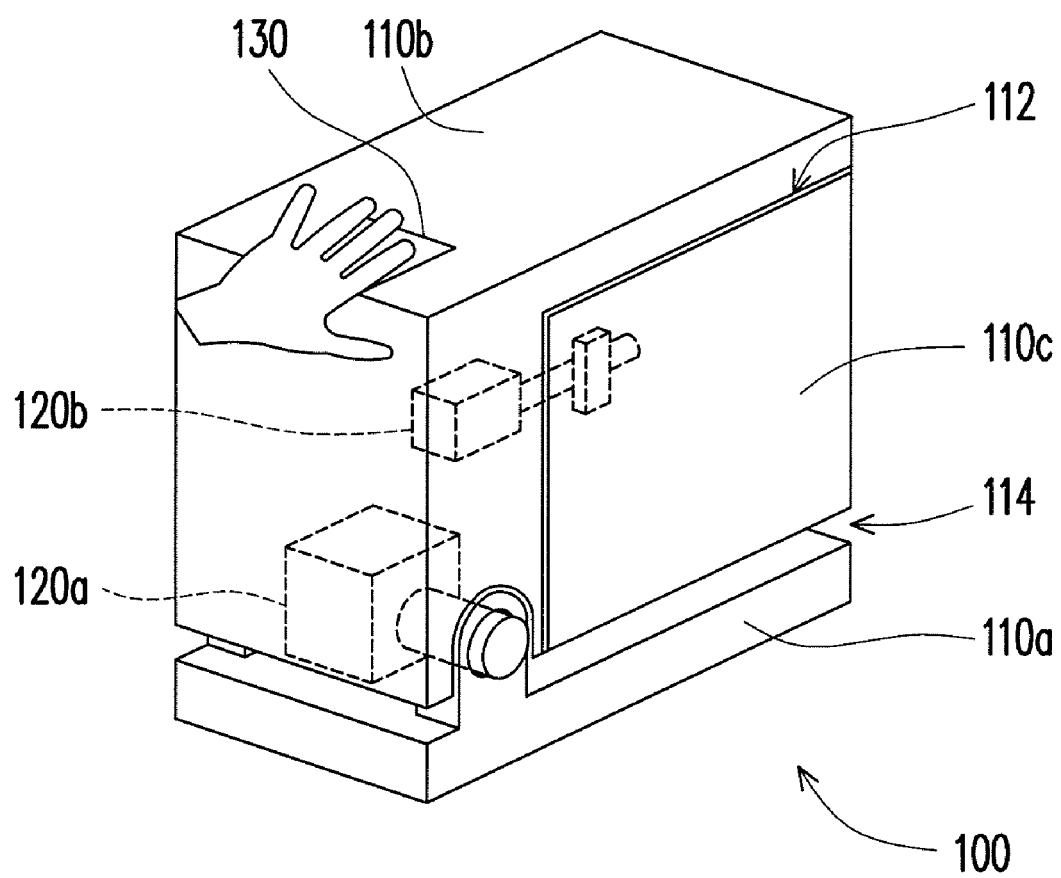
FIG. 1 is a schematic view of a computer according to an embodiment of the present invention.
Figure 2:
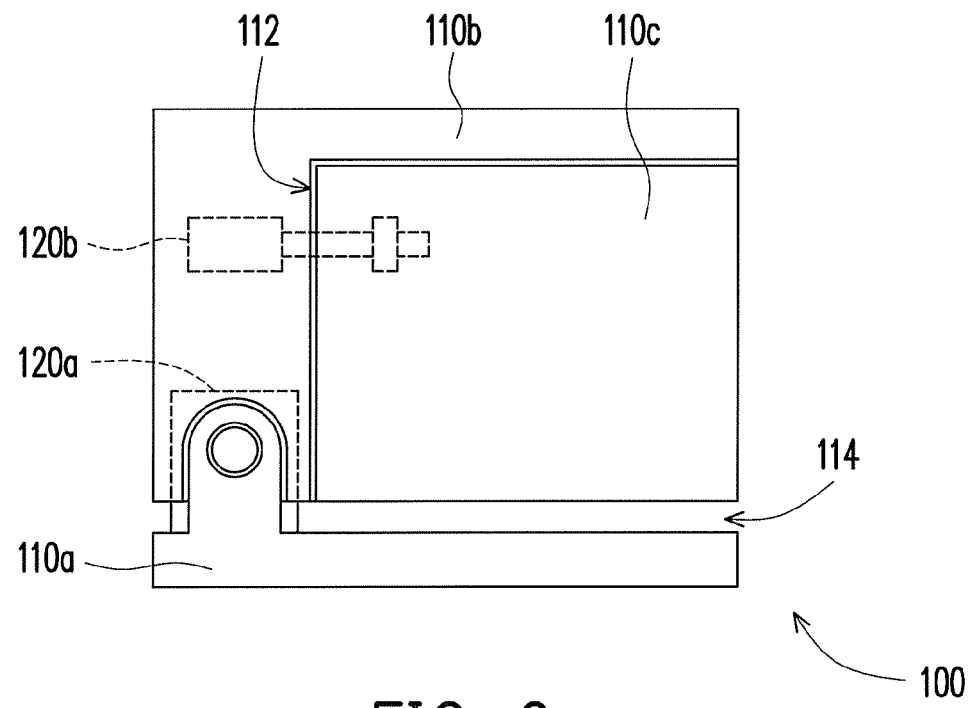
FIG. 2 is a side view of the computer in FIG. 1.
Figure 3:
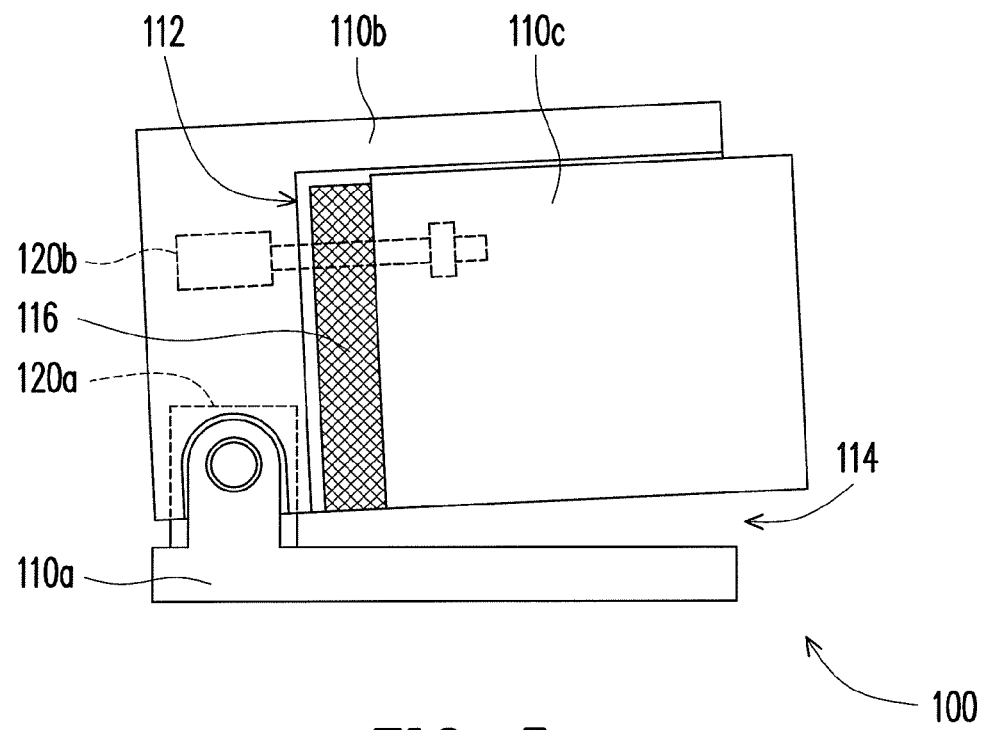
FIG. 3 is an operational side view of the computer in FIG. 1, after a relative movement.

FIG. 1 is a schematic view of a computer according to an embodiment of the present invention. FIG. 2 is a side view of the computer in FIG. 1. FIG. 3 is a side view of a plurality of cases, after a relative movement, of the computer in FIG. 1. Referring to both FIGS. 1 and 2, a computer 100 comprises three cases 110a, 110b and 110c, two driving mechanisms 120a and 120b and a starting unit 130. The driving mechanism 120a is connected between the case 110a and the case 110b, while the driving mechanism 120b is connected between the case 110b and the case 110c. The starting unit 130 is disposed at the case 110b, electrically connected to the driving mechanisms 120a and 120b, and used to start an operating system stored in a storage unit in the computer 100. When the starting unit 130 starts the operating system, the driving mechanism 120*a* drives a relative movement between the case 110*a* and the case 110*b* (preferably may be the case 110*b* pivot upward relative to the case 110*a*), while the driving mechanism 120*b* drives a relative movement between the case 110*b* and the case 110*c* (preferably the case 110*c* transversely move relative to the case 110*b*) to enhance heat dissipating efficiency of the computer 100.

According to the present embodiment, the cases 110*a*, 110*b* and 110*c* are respectively a base, a main body and a cover of the computer 100. The case 110*a* is hinged to the case 110*b*. A plurality of electronic devices (not shown) is disposed in the case 110*b*. The case 110*b* also comprises an opening 112. The case 110*c* covers the opening 112.

In addition, the driving mechanism 120*a* comprises, for example, a motor disposed on the case 110*a* and a transmission device connected between the case 110*b* and the motor. The motor drives relative rotation between the case 110*a* and the case 110*b* via the transmission device. Additionally, the driving mechanism 120*b* comprises, for example, a motor disposed on the case 110*b* and a transmission device connected between the case 110*c* and the motor. The motor drives relative rotation between the case 110*b* and the case 110*c* via the transmission device. The transmission device may include at least one transmission belt, gear wheel, rack or chain or other common transmission devices.

Furthermore, the starting unit 130 comprises, for example, a biometric verification device disposed on the case 110*b* and a power switch disposed on the case 110*b*. The biometric verification device is, for example, a fingerprint identification device used to identify fingerprints of the user. The biometric verification device is electrically connected to the power switch and decides whether to start the operating system stored in the storage unit via the power switch according to a biometric datum. However, according to other embodiments which are not illustrated, the biometric verification device may be a palm print identification device, a palm vein identification device or other biometric verification devices, which respectively identifies palm prints, palm vein patterns or other biometric data of the user.

In other words, when the user touches the fingerprint identification device with fingers of the user, the fingerprint identification device first identifies the fingerprints of the user. If the fingerprint identification device judges that the fingerprints of the user do not match data stored within, the operating system is not started. Oppositely, if the fingerprint identification device judges that the fingerprints of the user do match data stored within, the operating system is started. The computer 100 thereby has better confidentiality functions.

In addition, referring to FIG. 3, when the fingerprint identification device identifies the fingerprints of the user, the driving mechanism 120*a* drives a rotation of the case 110*b* relative to the case 110*a* to form a gap 114 between the case 110*a* and the case 110*b*. The size of the gap 114 is determined by range of the rotation. Simultaneously, the driving mechanism 120*b* may extend to drive the case 110*c* transversely move relative to the case 110*b* to expose at least a part of the opening 112. Therefore, heat generated when the electronic devices disposed in the case 110*b* perform calculations is not only dissipated through normal existing heat dissipating holes but also through the opening 112 and the gap 114. Therefore, compared with prior art, the computer of the present invention has better heat dissipating efficiency. Additionally, since the cases 110*a*, 110*b* and 110*c* of the computer 100 may be relatively moved, designs and functions thereof are more dazzling and unique.

According to the present embodiment, the case 110*b* may further comprise a meshed element 116, referring to FIG. 3, and the meshed element 116 covers at least a part of the opening 112. Moreover, when the driving mechanism 120*b* drives the relative movement between the case 110*b* and the case 110*c*, the case 110*c* exposes at least a part of the meshed element 116. The meshed element 116 is used to stop foreign object from entering the case 110*b* to prevent the foreign object from damaging the electronic devices in the case 110*b*.

However, the present invention is not limited to the aforesaid embodiment. According to other embodiments which are not illustrated, the driving mechanism 120*a* is used to drive a relative movement between the case 110*a* and the case 110*b*, and the driving mechanism 120*b* is used to drive relative rotation between the case 110*b* and the case 110*c*. Furthermore, the computer 100 may comprise only two cases and a driving mechanism connected between the two cases. The computer 100 may still use the driving mechanism to drive the relative movement or rotation between the two cases to enhance heat dissipating efficiency thereof.

In addition, according to other embodiments which are not illustrated, the starting unit may comprise a key and a power switch. The key may be disposed on one of the cases, while the power switch may be disposed in one of the cases and electrically connected to the key. The key is used to be pressed by the user and start the operating system via the power switch. Compared with the above said embodiments, the computer does not have the confidentiality functions provided by the biometric verification device but still has better heat dissipating efficiency.

In summary, when the operating system of the computer is started, the driving mechanism drives the relative movement or rotation between the cases to expose the opening of the cases or increase the size of the gap between the cases. Therefore, compared with the prior art, the computer of the present invention has better heat dissipating efficiency. Also, since the cases may be relatively moved or rotated, the designs and functions thereof are more dazzling and unique.

Furthermore, in the present invention, the key and the power switch of the starting unit of the computer may be further replaced by the biometric verification device and the power switch, so that the computer may judge whether to start the operating system according to the biometric data of the user. The computer thereby has better confidentiality functions.

Although the present invention has been described with reference to the above said embodiments, application of the present invention is not limited to these embodiments. It will be apparent to one of the ordinary skill in the art that modifications to the described embodiment may be made without departing from the spirit of the invention. Accordingly, the scope of the invention will be defined by the attached claims not by the detailed descriptions.

What is claimed is:

1. A computer, storing an operating system, the computer comprising:
    a first case;
    a second case;
    a driving mechanism, connected between the first case and the second case; and
    a starting unit, disposed at the first case, electrically connected to the driving mechanism, and used to start the operating system, wherein when the starting unit starts the operating system, the driving mechanism drives a relative movement between the first case and the second case to enhance heat dissipation efficiency of the computer.

2. The computer of claim 1, wherein the first case further has an opening; and the second case covering the opening and the relative movement driven by the driving mechanism between the first case and the second case make at least a part of the opening exposed.

3. The computer of claim 2, wherein the first case further comprises a meshed element, the meshed element covering at least a part of the opening.

4. The computer of claim 1, wherein the first case is hinged to the second case and the driving mechanism is used to drive relative rotation between the first case and the second case to form a gap between the first case and the second case.

5. The computer of claim 1, wherein the starting unit comprises:
   a key, disposed on the first case; and
   a power switch, disposed at the first case and electrically connected to the key, wherein the key is used to be pressed by a user to start the operating system via the power switch.

6. The computer of claim 1, wherein the starting unit comprises:
   a biometric verification device, disposed on the first case; and
   a power switch, disposed at the first case and electrically connected to the biometric verification device, wherein the biometric verification device is used to identify a biometric datum and decides whether to start the operating system via the power switch according to the biometric datum.

7. The computer of claim 6, wherein the biometric verification device comprises one of a fingerprint identification device, a palm print identification device and a palm vein identification device.

8. The computer of claim 1, wherein the driving mechanism comprises:
   a motor, disposed at the first case; and
   a transmission device, connected between the second case and the motor, the motor being used to drive the relative movement between the first case and the second case via the transmission device.

9. The computer of claim 8, wherein the transmission device includes at least one transmission belt, gear wheel, rack or chain.

10. The computer of claim 1, wherein the driving mechanism comprises:
    a motor, disposed at the second case; and
    a transmission device, connected between the first case and the motor, the motor being used to drive the relative movement between the first case and the second case via the transmission device.

11. The computer of claim 10, wherein the transmission device includes at least one transmission belt, gear wheel, rack or chain.

* * * * *